United States Patent

Lin

[11] Patent Number: 5,970,922
[45] Date of Patent: Oct. 26, 1999

[54] MULTIFUNCTIONAL FAVOR ANIMAL BOX

[76] Inventor: Hsun Chin Lin, No. 21, Alley 9, Lane 27, Sec.5, Min Shen E. Rd., Taipei, Taiwan

[21] Appl. No.: 09/209,927

[22] Filed: Dec. 8, 1998

[51] Int. Cl.$^6$ .................................................. A01K 29/00
[52] U.S. Cl. .............................................................. 119/867
[58] Field of Search ................................... 119/867, 868, 119/856, 858; 294/1.3, 1.5; D30/161, 162

[56] References Cited

U.S. PATENT DOCUMENTS

| | | | |
|---|---|---|---|
| D. 262,943 | 2/1982 | Schadler | D9/3 |
| 4,226,456 | 10/1980 | Barnett | 294/1.3 |
| 4,243,259 | 1/1981 | Wright | 294/1.3 |

Primary Examiner—Thomas Price
Attorney, Agent, or Firm—Rosenberg, Klein & Bilker

[57] ABSTRACT

A multifunctional favor animal box includes a box body, a cover and a carrying body. The box body has an opening on the end thereof. The cover covers the opening of the box body, a cylinder is extended from the inner side of the cover and is received within the box body and a holding portion is formed outside the cover. The carrying body is properly connected to the outer wall of the box body. The favor animal box of the present invention can be used as a shovel, a container, etc. for cleaning the dung of favor animal, which can be carried by the favor animal itself. The favor animal box has a beautiful outlook, and thus the user has no any uncomfortable feeling. Moreover, a board can be adhered on the concave portion of the box body for recording the address, name and other information about the favor animal. Therefore, by the present invention, a lost animal can be searched easily.

6 Claims, 4 Drawing Sheets

MULTIFUNCTIONAL FAVOR ANIMAL BOX

BACKGROUND OF THE INVENTION

1. Field of the Invention

The present invention relates to a multifunctional favor animal box, and especially to a favor animal box which can be hung on the neck of an animal for easily cleaning the dung of favor animal.

2. Description of the Prior Art

With the improvement of life, more and more peoples like to raise animals. However, the requirement about environment protection has become more strict than before. In general, people often carry papers, plastic bags and a shovel for cleaning the dung of animal. After the dung has been cleaned, those cleaning tools and dung are necessary carried to a proper place for being further processed. But it is very inconvenient to carry these cleaning tool and dung.

SUMMARY OF THE INVENTION

Accordingly, the object of the present invention is to provide a multifunctional favor animal box comprising a box body, a cover and a carrying body. The box body has an opening on the end thereof. The cover can cover the opening of the box body, a cylinder is extended from the inner side of the cover and is received within the box body and a holding portion is formed outside the cover. The carrying body is property connected to the outer wall of the box body. The favor animal box of the present invention can be used as a shovel, a container, etc. for cleaning the dung of favor animal, which can be carried by the favor animal itself. The favor animal box has a beautiful outlook, and thus the user has no any uncomfortable feeling. Moreover, a board can be adhered on the concave portion of the box body for recording the address, name and other information about the favor animal. Therefore, by the present invention, a lost animal can be searched easy.

The present invention will be better understood and its numerous objects and advantages will become apparent to those skilled in the art by referencing to the following drawings in which:

DETAILED DESCRIPTION OF THE PREFERRED EMBODIMENT

Figure 1:
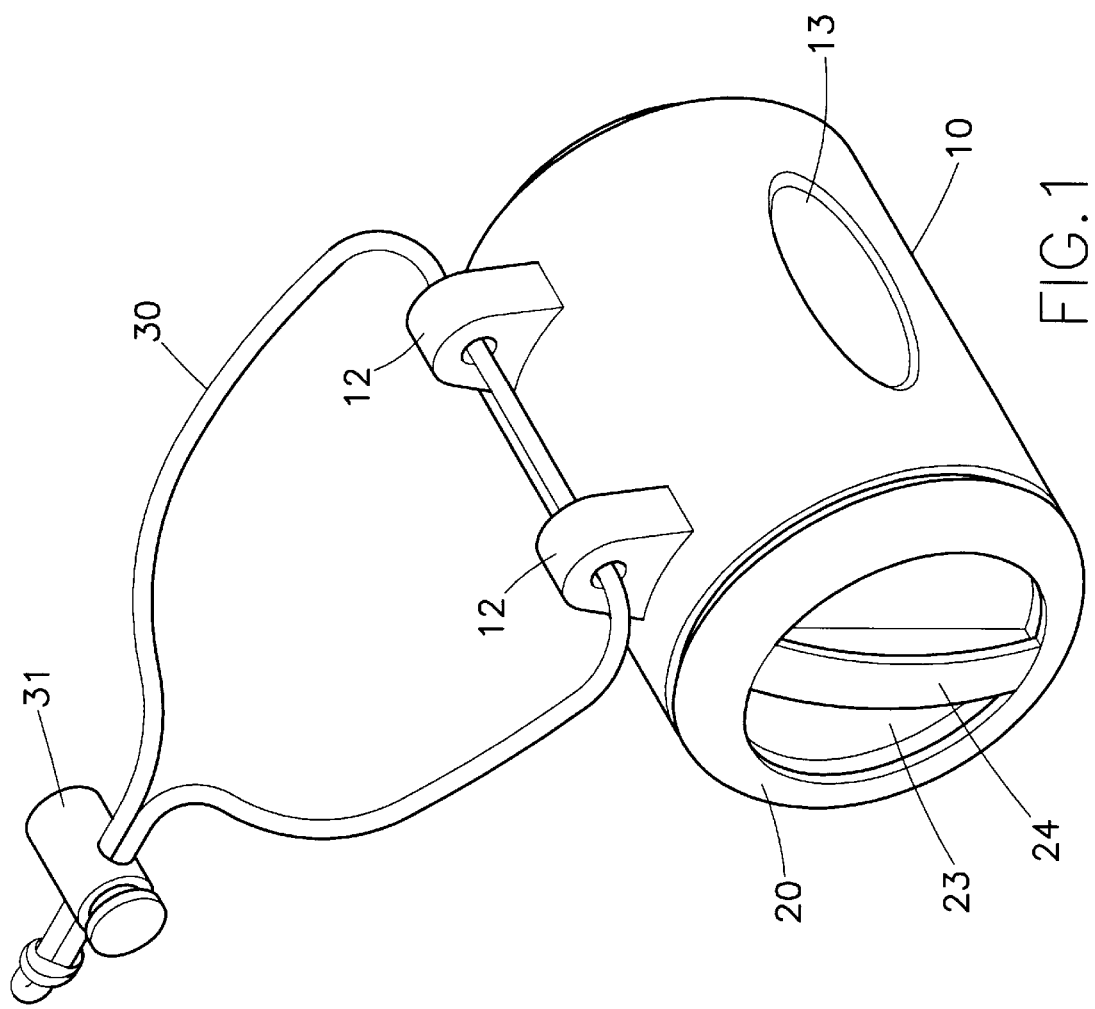
FIG. 1 is a perspective view of the present invention.
Figure 2:
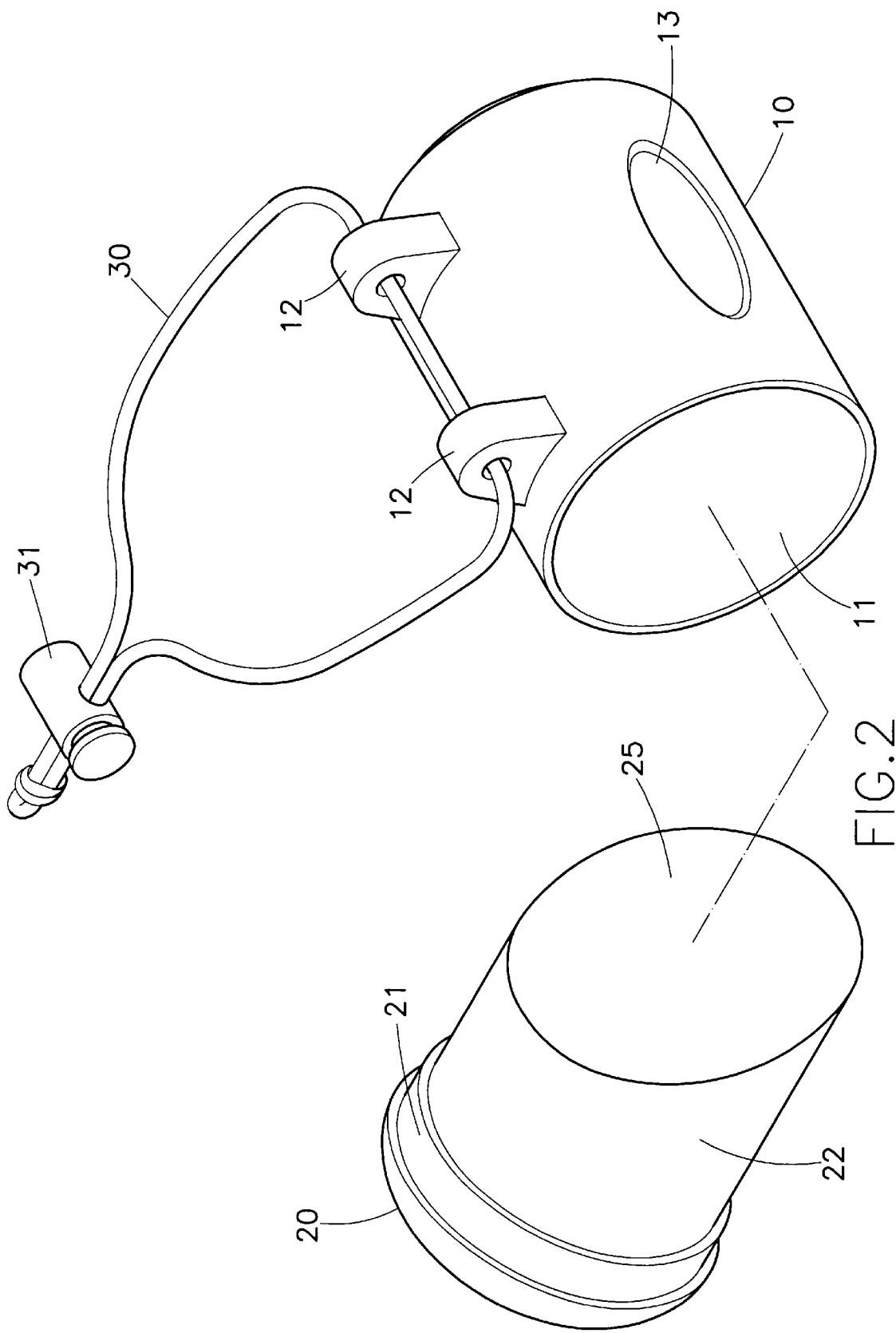
FIG. 2 is an exploded view of the present invention.
Figure 3:
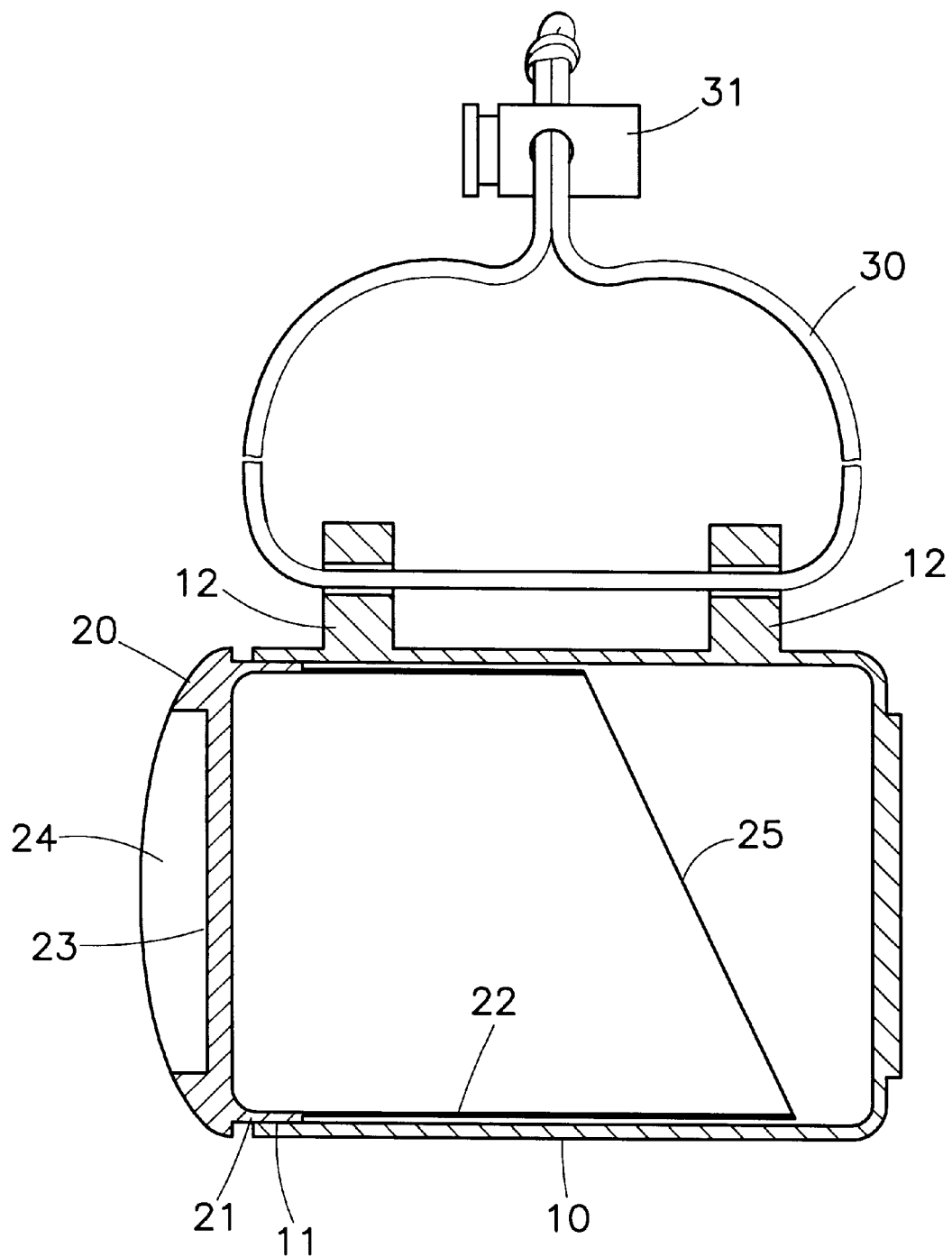
FIG. 3 is a plan cross sectional view of the present invention.

As shown FIGS. 1, 2 and 3, the multifunctional favor animal box of the present invention includes a box body 10, a cover 20 and a carrying body 30. The box body 10 is hollow body. One end thereof has an opening 11. The outer wall of the box body 10 is projected with two hole seats 12. The concave portion 13 can be installed on the outer wall of the box body 10 for being adhered with a board recorded with name, address, etc. of the favor animals.

The size of cover 20 is matched with the opening 11 of the box body 10. A circular engaging portion 21 is formed extendedly from the inner periphery of the cover 20 for engaging with the opening 11 of the box body 10 so that the box body 10 and the cover 20 are assembled as a tightly sealed container. A hollow cylinder 22 is formed on the inner side of the cover 20. The outer diameter of the cylinder 22 is smaller than the inner diameter of the box body 10. The cylinder 22 can be inserted into the box body 10. One end of the cylinder 22 is formed with an inclined end 25 for picking up the dung of animals. A plurality of grooves 23 without penetrating to the inner side are formed on the outer side of the cover 20 and a holding portion 24 is also formed so that thereby the fingers of the user can be inserted into the holes 23 to hold the holding portion 24. Thus, the cover 20 can be operated.

The carrying body 30 is made by ropes or other flexible materials and has a circular shape. The carrying body 30 passed through the hole seat 12 on the outer wall of the box body 10 so that the carrying body 30 can be connected with the outer wall of the box body 10. Further, an adjusting piece 31 is combined on the carrying body 30 for adjusting the size of the circular shape formed by the carrying body 30. Therefore, by aforementioned components, a favor animal box is assembled. The favor animal box may have various sizes so as to be suitable for many different kinds of favor animals (such as dog).

Figure 4:
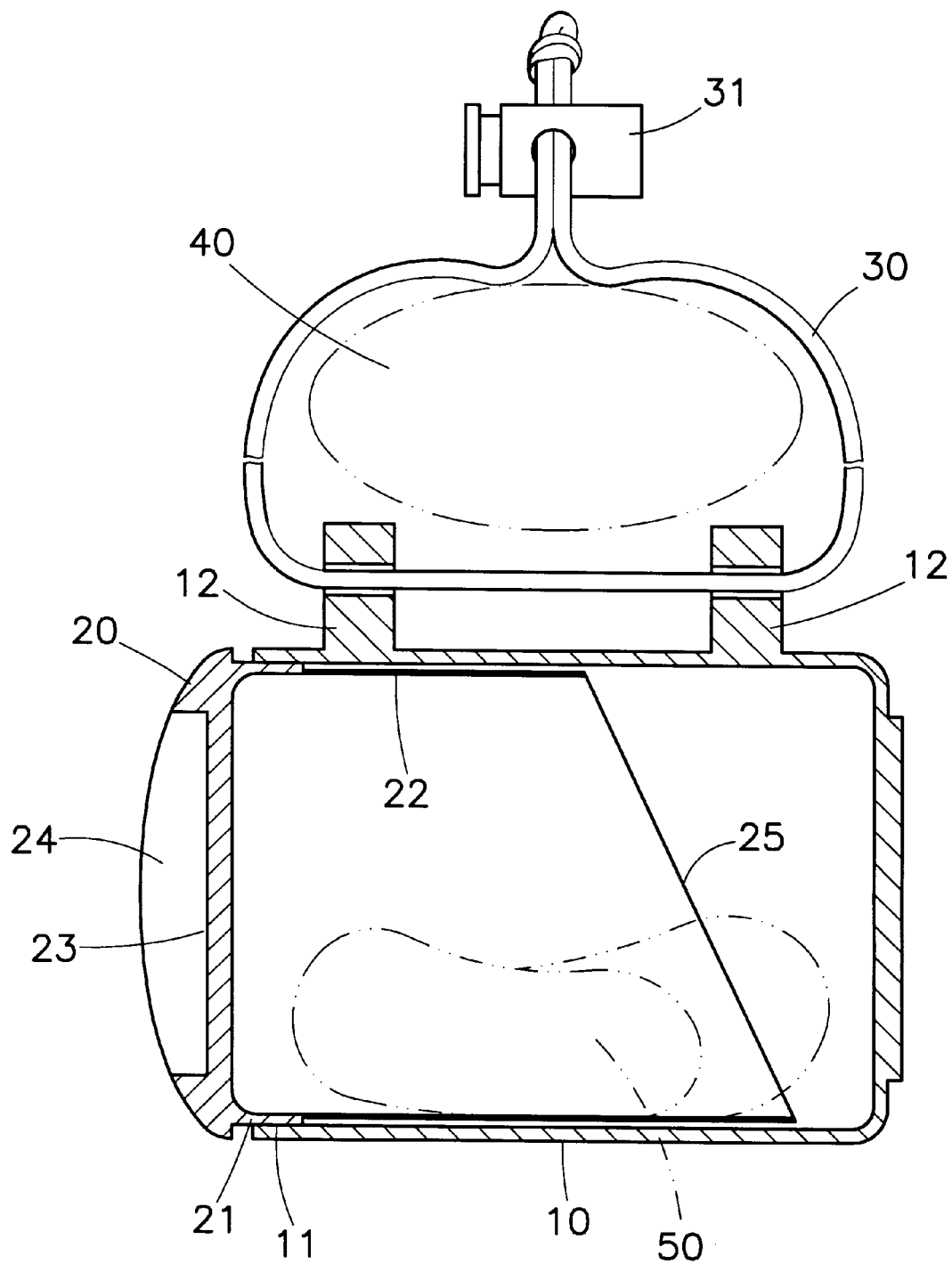
FIG. 4 is a schematic view of the present invention showing the usage of the present invention.

As shown in FIG. 4, the favor animal box of the present invention can be hung on the neck 40 of the favor animal by the carrying body 30. Thus, the favor animal will carry the favor animal box by itself. As the dung is excreted, the user opens the cover 20 and uses the cylinder 22 on the cover 20 as a shovel to pick up the dung 50. Then, the cover 20 is closed to seal the open 11 of the box body 10. Therefore, the box body 10 and the cover 20 form a sealed box so that the dung 50 of the favor animal is stored within the favor animal box.

The favor anal box of the present invention can be used as a shovel, a container, etc. for cleaning the dung of favor animal, which can be carried by the favor animal itself. The favor animal box has a beautiful outlook, the dung is tightly sealed within the favor animal box. Thus the user has no any uncomfortable feeling. Moreover, a board can be adhered on the concave portion 13 of the box body 10 for recording the address, name and other information about the favor animal. Therefore, by the present invention, a lost animal can be searched easily.

Accordingly, the favor animal box of the present invention can be used as a shovel, a container, etc. for cleaning the dung of favor animal, which can be carried by the favor animal itself. Another, the present invention also has the function of board for recording name, address, etc. Although the present invention has been described using specified embodiment, the examples are meant to be illustrative and not restrictive. It is clear that many other variations would be possible without departing from the basic approach, demonstrated in the present invention. Therefore, all such variations are intended to be embraced within the scope of the invention as defined in the appended claims.

| Descripton of the Numerals in Figures | |
|---|---|
| 10 Box body | |
| 11 Opening | 12 Hole seat |
| 13 Concave portion | |
| 20 Box body | |
| 21 Engaging poriion | 22 Cylinder |
| 23 Groove | 24 Holding portion |
| 25 Inclined end | |
| 30 Carrying body | |
| 31 Adjusting piece | |

| Descripton of the Numerals in Figures |
| --- |
| 40 Neck of a favor animal |
| 50 Dung |

What is claimed is:

1. A multifunctional favor animal box comprising:

a box body having a cylindrical outer wall with an opening formed at an end thereof,
   at least one hole seat extending outwardly from said outer wall of said box body, a closed contoured aperture being formed through said at least one hole seat;

a cover for covering said opening of said box body, said cover having an outer side and an inner side, a cylinder extending from said inner side of said cover for being received within said box body; said cylinder having an outer wall forming a closed cross-sectional contour, and a holding portion formed on said outer side of said cover; and a carrying body passing through said aperture of said at least one hole seat on said outer wall of said box body.

2. The multifunctional favor animal box according to claim 1, further including a concave portion provided on said outer wall of said box body for receiving a name board therein.

3. The multifunctional favor animal box according to claim 1, further including a circular engaging portion extending from said inner side of said cover, said circular engaging portion providing securement of said cover within said opening of said box body.

4. The multifunctional favor animal box according to claim 1, wherein said cylinder of said cover has a first end engaging said inner side of said cover and an inclined second end spaced from said first end.

5. The multifunctional favor animal box according to claim 1, further including a plurality of grooves formed on said outer side of said cover on opposing sides of said holding portion.

6. The multifunctional favor animal box according to claim 1, further including an adjusting piece combined with said carrying body for adjusting a length of said carrying body.

* * * * *